United States Patent [19]

Horlacher

[11] 4,044,577

[45] Aug. 30, 1977

[54] ANTI-THEFT DEVICE FOR PORTABLE APPARATUS

[75] Inventor: Albert F. Horlacher, Palatine, Ill.

[73] Assignee: Lock-A-Bike, Inc., Winnetka, Ill.

[21] Appl. No.: 721,688

[22] Filed: Sept. 9, 1976

[51] Int. Cl.$^2$ .............................................. B62H 5/00
[52] U.S. Cl. .......................................... 70/234; 70/49
[58] Field of Search ...................... 70/30, 49, 58, 233, 70/234, 235, 236; 211/5

[56] References Cited

U.S. PATENT DOCUMENTS

| | | | |
|---|---|---|---|
| 199,468 | 1/1878 | Rheubottom | 70/49 |
| 436,800 | 9/1890 | Parile | 70/49 X |
| 639,196 | 12/1899 | Fehling | 70/49 |
| 1,421,020 | 6/1922 | Miller | 70/236 X |
| 2,451,100 | 10/1948 | Lecompte | 70/233 X |
| 2,574,967 | 11/1951 | Gossner | 70/49 |
| 3,228,217 | 1/1966 | Atwill | 70/58 |
| 3,950,972 | 4/1976 | Bleier et al. | 70/234 |
| 3,990,276 | 11/1976 | Shontz | 70/49 X |

FOREIGN PATENT DOCUMENTS

| | | | |
|---|---|---|---|
| 866,462 | 5/1941 | France | 70/234 |
| 123,470 | 11/1948 | Sweden | 70/58 |

*Primary Examiner*—Roy D. Frazier
*Assistant Examiner*—Thomas J. Holko
*Attorney, Agent, or Firm*—Silverman & Cass, Ltd.

[57] ABSTRACT

An automatic anti-theft device or lock is secured to a support of a portable apparatus to secure the apparatus against theft. The lock has two mating halves secured together to form a shatter-proof casing. One casing half includes a hollow spindle integral with the inside wall of the casing half, a retractile reel mounted on the spindle with a cable secured at one end thereto and wrapped around the reel. The second free end of the cable extends through one wall of the casing. The second casing half mounts a lock mechanism having a rotatable lock member which extends into the spindle when the casing halves are joined. The free end of the cable includes a lock cylinder which aligns with the rotatable lock member when it is inserted into the first casing half, and is secured by the rotatable lock member. The first casing member includes a slidable latch which is spring-biased to a first position to engage and latch the reel against rotation. The latch may be moved against the spring bias when the free end of the cable is not engaged in the casing to allow the reel to move and the cable to be extended or retracted. When the cable is at the desired extended position, the latch is released to secure the reel and the lock cylinder is inserted into the casing which prevents the latch from being moved from the first position. The cable is secured around some immovable object before it is inserted into the casing.

17 Claims, 11 Drawing Figures

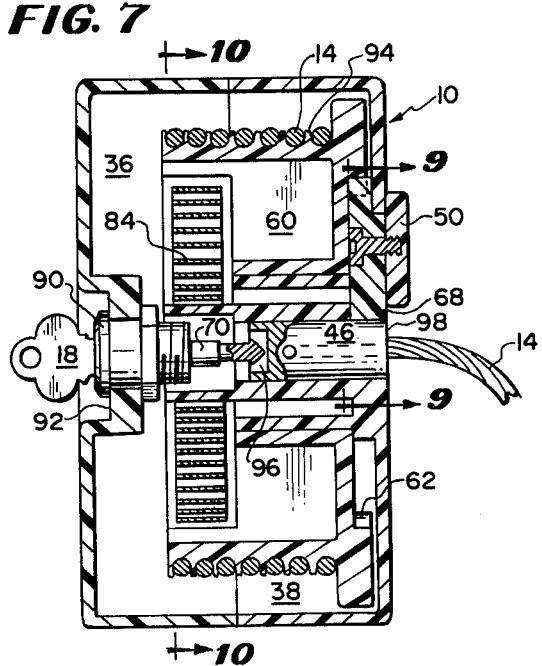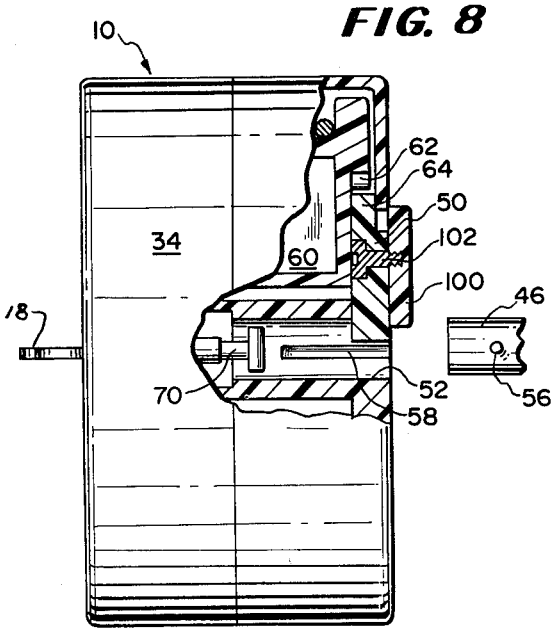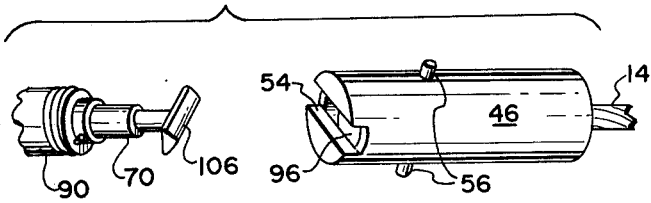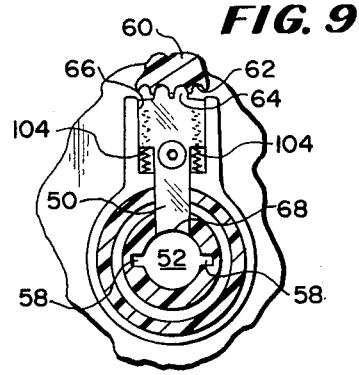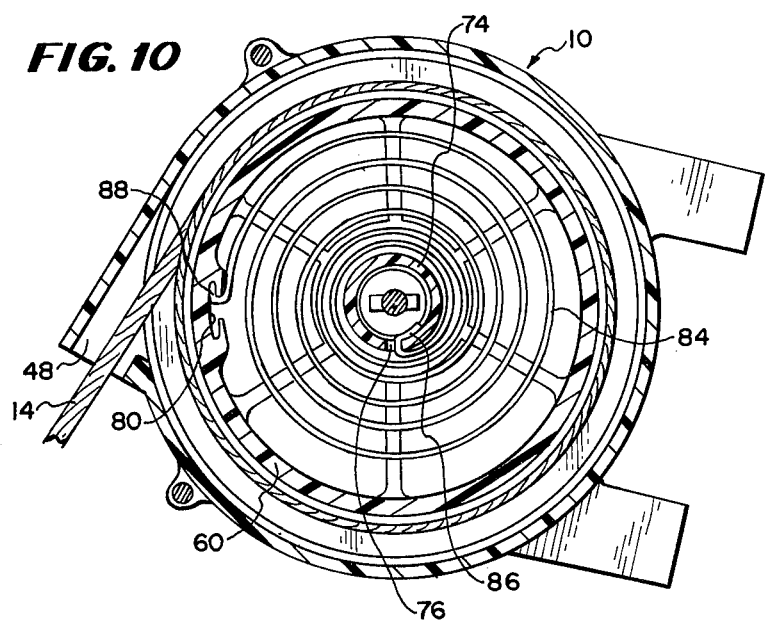

ANTI-THEFT DEVICE FOR PORTABLE APPARATUS

BACKGROUND OF THE INVENTION

The invention relates to a lock for releasably securing portable apparatus against theft and more particularly, to a lock enclosed in a casing which includes an automatically retractable cable which may be extended from the casing around a secure object and locked by its free end into the casing to secure the instrument against theft. For explanatory purposes, such apparatus will conveniently refer to a bicycle or other vehicle and portable athletic gear and like valuable property.

Current interest in bicycling and other recreational activities involving portable instruments has brought about an increased possibility of theft of the instruments when they have to be left unattended. An individual chain and lock may be carried as one solution to the problem, but this is cumbersome and easy to misplace. Thus, the need has developed for a device which may be permanently carried with the bicycle or other portable instruments, which is easily manipulated and operated to lock the instrument to a secure, stationary object.

The prior art discloses numerous patented devices which are intended to be used with portable instruments, such as bicycles or skis. U.S. Pat. Nos. 3,670,535 and 3,714,803 are directed to devices intended to be secured to ski equipment to prevent their theft. U.S. Pat. No. 3,950,972 is directed to a device for securing a bicycle against theft. Each of these devices and other devices, such as disclosed in U.S. Pat. No. 2,933,915, include a retractile cable capable of being secured around a fixed object and then locked to the lock device to secure the instrument against theft.

Each of these patented devices are believed to exhibit certain disadvantages. For instance, none of these devices have the simplicity of construction and operation of the bicycle lock of the invention. The bicycle lock of the invention has a casing containing an automatically retractile cable with a free end which may be locked into the casing in any desired position of the cable. The casing has a latch biased against the cable reel which must be released for the cable and reel to be extended or retracted. When the free end of the cable is locked into the casing, it prevents the latch from being released.

SUMMARY OF THE INVENTION

The above and other disadvantages of prior art portable instrument locking devices and techniques are overcome in accordance with the present invention by providing a lightweight, durable, locking device with an automatically retractable cable which can be locked in any position. The locking device includes a non-shatterable synthetic plastic casing formed of two mating casing halves. One casing half has an internal hollow spindle with the cable and reel mounted thereon and a coil spring connected between the spindle and reel to automatically return the cable which extends through the casing. The second casing half has a lock mechanism including a rotating T-member which extends inward toward the center of the hollow spindle. The free end of the cable includes a slotted lock cylinder which has projections which align in a hole through the first casing half and spindle to engage the T-bar member which is rotated to lock the free end of the cable in the casing. The reel has teeth spaced around the periphery thereof which are engaged by a latch biased against the teeth to lock the reel and cable in any desired location. When the free end of the cable is removed from the casing, the latch may be moved into the opening in the casing away from the teeth of the reel to allow the cable to be extended or automatically retracted by the spring.

BRIEF DESCRIPTION OF THE DRAWINGS

FIG. 7 is a sectional view taken through the locking device along line 7—7 of FIG. 5 and in the general direction indicated;

FIG. 8 is an end elevational view of the locking device with the free end of the cable removed, portions of the casing being in section to show details;

FIG. 9 is a fragmentary sectional view of the latch taken along line 9—9 of FIG. 7 and in the direction indicated generally;

FIG. 10 is a sectional side view of the locking device taken along line 10—10 of FIG. 7 and in the direction indicated generally;

FIG. 11 is an exploded perspective view of the free end of the cable and locking member of the locking device shown poised for cooperative engagement one with the other.

DESCRIPTION OF THE PREFERRED EMBODIMENT

Figure 1:
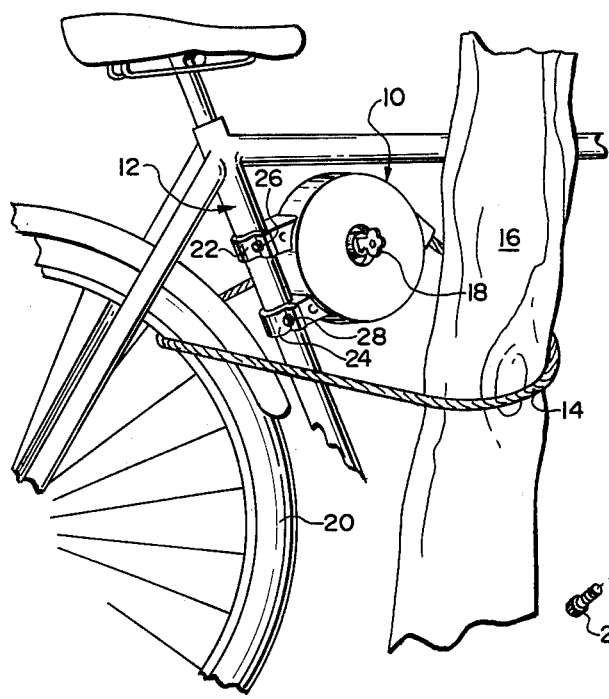
FIG. 1 is a fragmentary perspective view showing the locking device embodying the invention mounted on a bicycle frame which is partially illustrated.

Referring now to FIG. 1, the locking device embodying the invention is designated generally by the reference character 10 and is shown mounted on the frame of a bicycle 12. Bicycle 12 is shown as one example of a portable instrument or apparatus with which the locking device 10 is capable of being used; however, it is contemplated that there are other portable instruments with which the locking device 10 is capable of being used, such as a motorcycle, a boat and other vehicles or gear.

For locking the bicycle against theft, the user extends a flexible cable 14 from the locking device 10 around any convenient, secure, fixed object, such as a tree 16, before inserting the free end of the cable 14 into the locking device 10 and locking it with a key 18. The cable 14 may also be secured around other desired parts of the portable instrument, such as a tire wheel 20 or other parts of the instrument before it is locked into the device 10.

The locking device 10 is secured to the bicycle frame 12 by any convenient method, such as a pair of brackets 22 and 24. The brackets 22 and 24 may be secured to the locking device by pairs of bolts or screws 26 and 28, only one of each pair being shown.

Figure 2:
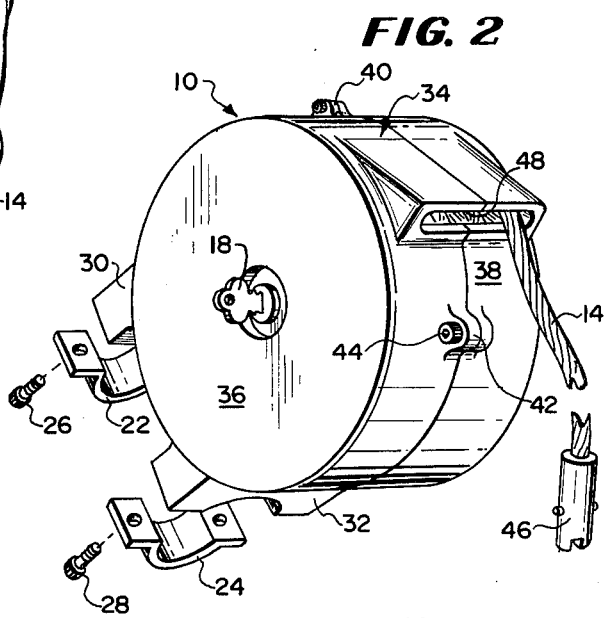
FIG. 2 is a perspective view of said locking device showing the key lock and mounting brackets.

The brackets 22 and 24 are best illustrated in FIG. 2. The brackets are curved to accommodate the bicycle frame 12, but, of course, may be of other shapes as desired, or omitted if the device 10 is secured directly to the instrument. The brackets 22 and 24 are secured to legs 30 and 32 of the locking device 10 which are also illustrated in a curved shape to accommodate the bicycle frame 12. The locking device 10 has an outer casing 34 which is formed by two mating casing halves 36 and 38. The casing 34 is preferably formed from a non-shatterable polycarbonate material which is formed by molding or casting or other suitable methods.

The casing halves 36 and 38 may be secured together by pairs of ears 40 and 42 which may be permanently sealed by ultrasonic welding or secured by a screw 44. The free end of the cable 14 is provided with a lock cylinder 46. The cable 14 extends through a slot 48 formed in one end of the casing halves 36 and 38.

Figure 3:
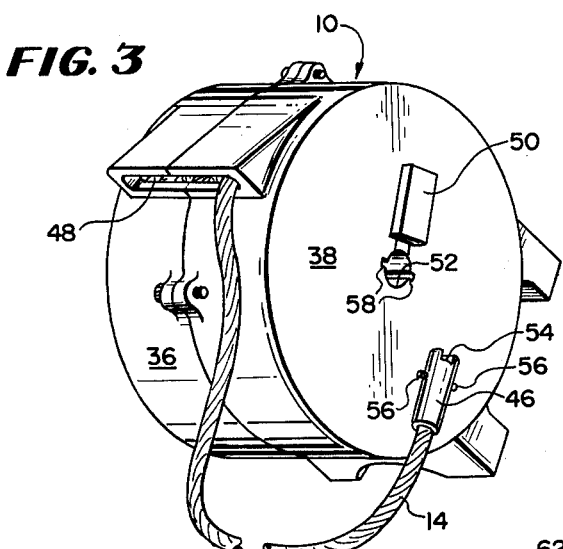
FIG. 3 is a side perspective view of the opposite side of said locking device.

The cable 14 and the lock cylinder 46 are extended to the desired position by operation of a sliding latch 50, illustrated in FIG. 3. The lock cylinder 46 is engaged in the casing half 38 through an opening 52 in the casing half 38. The lock cylinder 46 is at least partially hollow and has a slot 54 formed in its outer end which is aligned with the lock mechanism by two projections 56 on opposite sides of the lock cylinder 46. These projections are engaged in opposite slots 58 in the opening 52 when the lock cylinder 46 is engaged, which aligns the lock cylinder slot 54 with the lock mechanism, as more fully described hereinafter.

Figure 4:
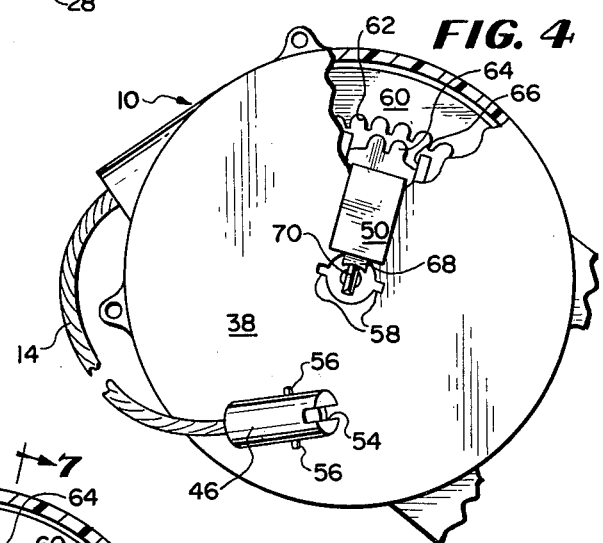
FIG. 4 is a side elevational view of the locking device with portions broken away to show details.
Figure 5:
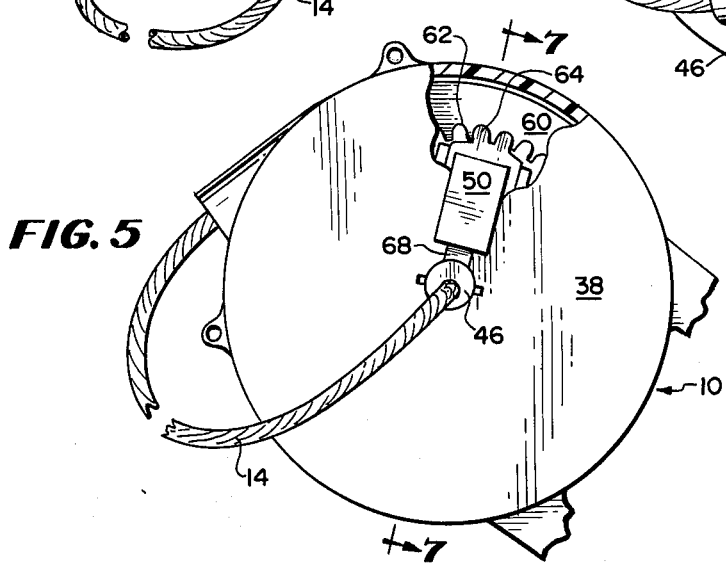
FIG. 5 is an elevational view similar to that of FIG. 4 with the latch illustrated engaging the reel.

The operation of the latch 50 and the lock cylinder 46 is illustrated in FIGS. 4 and 5. The cable 14 is wound around a cable reel 60 which is partially illustrated. The inner periphery of the cable reel 60 has a series of teeth 62 spaced around it. One end of the sliding latch 50 has mating projections 64 which engage with the teeth 62 to lock the reel 60 and cable 14 from movement in a first latched position as illustrated in FIG. 5.

The sliding latch is biased (FIG. 9) toward the first position to latch the reel 60 against movement. The latch 50 slides in a track 66. A second end 68 of the latch 50 is tangent to the opening 52 when the latch is in the first latched position and abuts the lock cylinder 46 when it is engaged. The end 68 extends into the opening 52 when the latch 50 is in a second released position (FIG. 4). It can thus be appreciated that the lock cylinder 46 when inserted into the opening 52 of the casing half 38 holds the latch 50 in its first position and prevents the reel 60 and the cable 14 from being moved.

The key 18 rotates a T-shaped lock member 70 (FIG. 4), the end of which, can be seen through the opening 52. The slots 58 of the opening cooperating with the projections 56 of the lock cylinder 46 to align the slot 54 with the T-shaped lock member 70 which may then be rotated 90° by the key 18 to lock the cable 14 into the casing 34.

Figure 6:
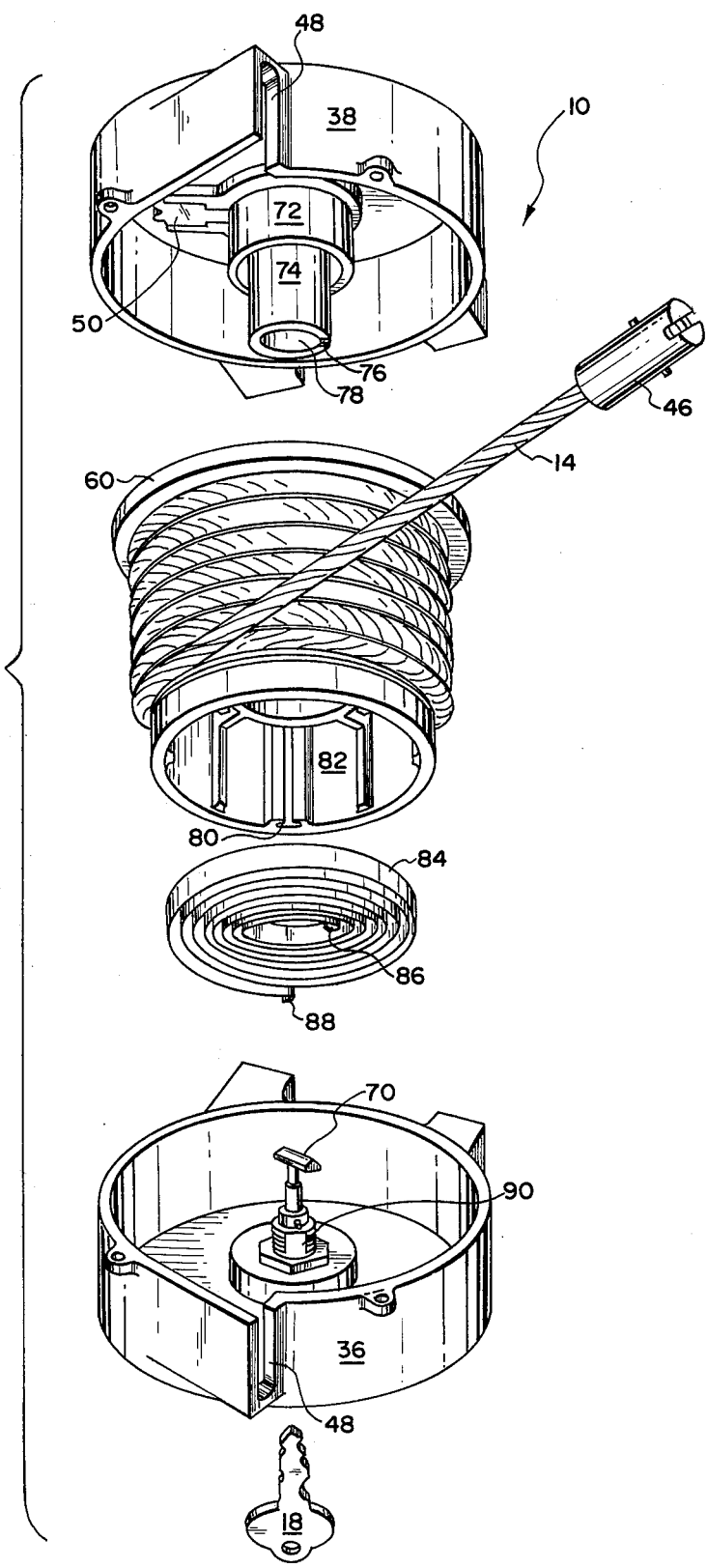
FIG. 6 is an exploded perspective view of the locking device of the invention.

The construction of the locking device 10 is best illustrated in FIG. 6. The casing half 38 has a spindle 72 upon which the reel 60 is mounted. An extension 74 of the spindle 72 has a slot 76 and an opening 78 into which the T-shaped lock member 70 extends when the casing halves 36 and 38 are mated.

The reel 60 has the cable 14 wound around the periphery thereof. A groove 80 is provided on an inside wall 82 of the reel 60. A coil spring 84 has a first end 86 which is inserted into the spindle slot 76 and a second end 88 which is inserted into the groove 80 of the cable reel 60. The coil spring 84 is tensioned such that the cable 14 will automatically retract when the sliding latch 50 is moved to its second position. The tension of the spring 84 is adjusted such that the cable 14 will be automatically retracted into the casing 34 without backlash of the cable 14 and lock cylinder 46.

The key 18 rotates the T-shaped lock member 70 in a locking mechanism 90 which is mounted in the casing half 36. The locking mechanism 90 may be any standard type of locking mechanism, which preferably allows the key to be retracted only when in the locked position.

As best illustrated in FIG. 7, the locking mechanism 90 preferably is mounted in the casing half 36 in an indentation 92 to impede access to the locking mechanism 90. The cable reel 60 is provided with grooves 94 on its outer periphery to accommodate the cable 14. The teeth 62 cooperating with the latch 50 are formed on the inner periphery of the cable reel 60.

The various members of the locking device 10 are dimensioned such that the T-shaped lock member 70 is just inserted through the slot 54 into a chamber 96 of the lock cylinder 46. The T-shaped lock member is then turned 90° (FIG. 7) to lock the lock cylinder 46 into the casing 34.

When locked, the latch 50 is retained in its first latched position by the lock cylinder 46 bearing against the second end 68 of the latch. The lock cylinder 46 is dimensioned such that its exposed end 98 is substantially parallel to the outer surface of the casing half 38. This further prevents tampering with the locking device 10.

To release the cable 14, the key 18 and T-shaped lock member 70 are turned 90° as illustrated in FIG. 8. This permits the T-shaped lock member 70 to slide through the slot 54 in the end of the lock cylinder 46 as the cable is withdrawn from the casing 34. The latch 50 may be then moved into the opening 52 by pressing down on a latch projection 100 which may be fastened to the internal part of the latch by a screw 102, or could be formed as one piece. Pushing down on the projection 100 disengages the latch projections 64 from the reel teeth 62 allowing the tension of the coil spring 84 to automatically retract the cable 14.

The latch 50 is biased toward its latched first position by a pair of springs 104. This tends to keep the latch projections 64 mated with the teeth 62 of the reel 60 to keep the cable 14 from moving unless the lock cylinder 46 is removed from the opening 52 and the latch 50 is manually released.

The mounting of the coil spring 84 between the reel 60 and the spindle 74 is best illustrated in FIG. 10. The first or inner end 86 of the coil spring 84 is inserted in the slot 76 of the spindle 74. The second or outer end 88 of the coil spring 84 is inserted in the groove 80 on the inside wall of the reel 60. It is contemplated, within the scope of the invention, that other return type mechanisms could be substituted for the coil spring 84 which is illustrated.

The details of the T-shaped lock member 70 of the locking mechanism 90 and of the lock cylinder 46 are best illustrated in FIG. 11. A cross bar 106 of the T-shaped lock member 70 is dimensioned such that it will easily pass through the slot 54 in the end of the lock cylinder 46. The ends of the cross bar 106 will be secured in the chamber 96 when the T-shaped lock member 70 is rotated a few degrees; however, a typical locking mechanism 90 would be rotated essentially 90°.

As previously mentioned, the casing halves 36 and 38 preferably are molded from a shatter-proof polycarbonate material. The latch 50 as well as the cable reel 60 may also be made of the same polycarbonate material. The T-shaped lock member 70 and the lock cylinder 46 would preferably be made from high tensile strength metal. The biasing means 84 and 104 may be replaced by other conventional biasing elements, if desired. The cable 14 would preferably be made of flexible, high tensile metal wire, preferably, multi-strand, and coated with a flexible plastic material. It will be noted that the locking mechanisms will not be ruptured when the casings are shattered, if successfully done.

Modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An automatic locking device adapted to be operably mounted on a support which is rigidly formed with a bicycle or like portable instrument for releasably securing said instrument against theft, said locking device comprising:
   i. a substantially enclosed casing;
   ii. a spindle secured within said casing and having retractile reel means mounted thereon;
   iii. said reel means including a flexible cable having one end secured thereto and a protruding second free end extending through said casing, and means for automatically retracting said cable when it is extended from said casing;
   iv. latch means supported on said casing for latching said reel means against movement in a first position, and for releasing said reel means for movement in a second position;
   v. said free end of the cable arranged to be engaged through said casing with said latch means in said first position; and
   vi. lock means supported on said casing for releasably locking said free end of the cable in said casing and concurrently preventing movement of the reel means and latch means.

2. A locking device as claimed in claim 1 wherein: said means for automatically retracting said cable include coil spring means engaged at one end to said spindle and at a second end to said reel means for tensioning said reel means just sufficient to automatically retract said extended cable.

3. A locking device as claimed in claim 1 wherein: said casing includes two mating casing parts, a first part having said spindle secured on the inside of one wall thereof; and
a second part includes said lock means supported in one wall thereof opposite said spindle.

4. A locking device as claimed in claim 3 wherein: said mating casing parts, said spindle, said reel means and said latch means are formed from non-shatterable polycarbonate material.

5. A locking device as claimed in claim 1 wherein: said reel means include teeth spaced around the periphery thereof; and
said latch means include mating projections to engage said teeth in said first latch position to latch said reel means and said cable in any desired position.

6. A locking device as claimed in claim 5 wherein: said latch means include a projection which bars said free end of said cable from being engaged through said casing when said latch means is in said second position.

7. A locking device as claimed in claim 1 wherein: said spindle includes an opening aligned with an opening in said casing through which said free end of said cable is engaged;
said lock means include means for engaging said free end of said cable, extending towards said opening in said casing, when said free end is engaged through said casing.

8. A locking device as claimed in claim 7 wherein: said extending means for engaging include a rotating T-member aligned with said opening in said casing; and
said free end of said cable includes means having a hollow portion with a transverse slot disposed across a closed end of said hollow portion and alignment means for aligning said slot with said T-member when said free end is engaged through said casing to insert said T-member through said slot into said hollow portion to lock said free end in said casing when said T-member is rotated.

9. A locking device as claimed in claim 7 wherein: said reel means include teeth spaced around the periphery thereof; and
said latch means include mating projections to engage said teeth in said first latch position to latch said reel means and said cable in any desired position.

10. A locking device as claimed in claim 9 wherein: said latch means include a projection which is aligned with said casing opening in said first position abutting said free end of said cable when said free end is engaged through said casing, said projection movable into said opening to release said cable in said second position, only when said free end is withdrawn from said casing; and
means for biasing said latch means toward said first position.

11. A locking device as claimed in claim 1 wherein: said means for automatically retracting said cable include coil spring means engaged at one end to said spindle and at a second end to said reel means for tensioning said reel means just sufficient to automatically retract said extended cable;
said casing includes two mating casing parts;
a first casing part having said spindle secured on the inside of one wall thereof and having an opening aligned with an opening in said spindle;
a second casing part having said lock means supported in one wall thereof and said lock means including means for engaging aligned with and extending towards said opening in said first casing part, for engaging said free end of said cable when said free end is engaged through said opening in said first casing part; and
said latch means mounted in said first casing part and including first means for engaging said reel means in said first position and abutting said free end of said cable when it is engaged through said opening in said first casing part, and second means extending into said first casing opening to move said latch means to said second position only when said free end of said cable is removed.

12. An automatic locking device adapted to be operably mounted on a support which is rigidly formed with a bicycle or like portable instrument for releasably securing said instrument against theft, said locking device comprising:
   i. a substantially enclosed casing including a first and a second mating casing parts;

ii. a spindle secured within said first casing part and having retractile reel means mounted thereon;
iii. said reel means including a flexible cable having one end secured thereto and a protruding second free end extending through said casing, and means for automatically retracting said cable when it is extended from said casing;
iv. latch means supported on said first casing part for latching said reel means against movement in a first position, and for releasing said reel means for movement in a second position;
v. said free end of the cable arranged to be engaged through an opening in said first casing part with said latch means in said first position; and
vi. lock means supported in said second casing part for releasably locking said free end of the cable in said casing and concurrently preventing movement of the reel means and latch means.

13. A locking device as claimed in claim 12 wherein:
said mating casing parts, said spindle, said reel means and said latch means are formed from non-shatterable polycarbonate material; and
said means for automatically retracting said cable include coil spring means engaged at one end to said spindle and at a second end to said reel means for tensioning said reel means just sufficient to automatically retract said extended cable.

14. A locking device as claimed in claim 12 wherein:
said spindle includes an opening aligned with said opening in said first casing part through which said free end of said cable is engaged;
said lock means include means for engaging said free end of said cable, extending towards said openings, when said free end is engaged through said openings.

15. A locking device as claimed in claim 14 wherein:
said extending means for engaging include a rotating T-member aligned with said openings; and
said free end of said cable includes a hollow portion with a transverse slot disposed across a closed end of said hollow portion and alignment means for aligning said slot with said T-member when said free end is engaged through said openings to insert said T-member through said slot into said hollow portion to lock said free end in said casing when said T member is rotated.

16. A locking device as claimed in claim 12 wherein:
said reel means include teeth means spaced around the periphery thereof;
said latch means include mating projection means to engage said teeth means in said first position to latch said reel means and said cable in any desired position; and
means for biasing said latch means toward said first position.

17. A locking device as claimed in claim 12 wherein:
said latch means include bar means which are aligned with said casing opening in said first position abutting said free end of said cable when said free end is engaged through said opening, said bar means movable into said opening to release said cable in said second position only when said free end is withdrawn from said opening.

* * * * *